United States Patent
Starz et al.

(10) Patent No.: US 9,446,906 B2
(45) Date of Patent: Sep. 20, 2016

(54) SPINDLE CONVEYOR, AND WORKPIECE TREATMENT STATION COMPRISING THE SAME

(75) Inventors: Reiner Starz, Weil der Stadt (DE); Ulrich Hofbauer, Gaeufelden (DE)

(73) Assignee: EISENMANN AG, Boeblingen (DE)

( * ) Notice: Subject to any disclaimer, the term of this patent is extended or adjusted under 35 U.S.C. 154(b) by 0 days.

(21) Appl. No.: 13/261,773

(22) PCT Filed: Apr. 26, 2012

(86) PCT No.: PCT/EP2012/001780
§ 371 (c)(1),
(2), (4) Date: Nov. 7, 2013

(87) PCT Pub. No.: WO2012/152380
PCT Pub. Date: Nov. 15, 2012

(65) Prior Publication Data
US 2014/0061002 A1   Mar. 6, 2014

(30) Foreign Application Priority Data
May 7, 2011   (DE) .................. 10 2011 100 825

(51) Int. Cl.
| | |
|---|---|
| B65G 35/06 | (2006.01) |
| B65G 47/244 | (2006.01) |
| B65G 29/00 | (2006.01) |
| B65G 17/32 | (2006.01) |
| B65G 47/84 | (2006.01) |
| B65G 19/02 | (2006.01) |

(Continued)

(52) U.S. Cl.
CPC ............... *B65G 35/06* (2013.01); *B61B 10/02* (2013.01); *B61B 10/04* (2013.01); *B65G 17/32* (2013.01); *B65G 17/48* (2013.01); *B65G 19/02* (2013.01); *B65G 29/00* (2013.01); *B65G 35/063* (2013.01); *B65G 47/244* (2013.01); *B65G 47/841* (2013.01)

(58) Field of Classification Search
CPC ...... B65G 17/32; B65G 17/48; B65G 29/00; B65G 19/02; B65G 35/063; B65G 47/244; B65G 47/841
USPC ............ 198/465.1, 465.2, 465.4, 469.1, 394, 198/377.02, 377.06, 377.1, 867.09, 867.15
See application file for complete search history.

(56) References Cited

U.S. PATENT DOCUMENTS 6,330,952 B2 * 12/2001 Summa et al. ............. 213/62 R
6,814,218 B2 * 11/2004 Nishihara .................. 198/465.1

(Continued)

FOREIGN PATENT DOCUMENTS

| AT | 225113 | 3/1962 |
| DE | 29 12 783 | 12/1979 |

(Continued)

*Primary Examiner* — Leslie A Nicholson, III
(74) *Attorney, Agent, or Firm* — Factor Intellectual Property Law Group, Ltd.

(57) ABSTRACT

A spindle conveyor for conveying workpieces, in particular vehicle wheels, having a rail system that includes at least one support rail. Multiple conveyor carriages have a chassis that can be moved on the support rail in a conveying direction and a supporting device for workpieces which is entrained by the chassis. Each workpiece can be mounted on a workpiece spindle which is part of the supporting device which has a pair of workpiece spindles mounted so as to be rotatable as a unit relative to the chassis about a vertical axis of rotation and can be moved at least into a first rotational position and a second rotational position. Also a station for treating workpieces, in particular vehicle wheels, with such a spindle conveyor which allows the workpieces to be conveyed through the station.

17 Claims, 6 Drawing Sheets

(51) Int. Cl.
*B65G 17/48* (2006.01)
*B61B 10/02* (2006.01)
*B61B 10/04* (2006.01)

(56) References Cited

U.S. PATENT DOCUMENTS

| | | |
|---|---|---|
| 6,919,008 B2 * | 7/2005 | Makimura et al. ............ 204/623 |
| 7,201,105 B2 * | 4/2007 | Nishihara et al. ......... 104/172.3 |
| 7,421,953 B2 * | 9/2008 | Johansson et al. ........... 104/166 |
| 2003/0005884 A1 | 1/2003 | Makimura et al. |
| 2003/0201152 A1 | 10/2003 | Breyer et al. |
| 2003/0213675 A1 | 11/2003 | Dooley |
| 2004/0216985 A1 | 11/2004 | Nishihara et al. |

FOREIGN PATENT DOCUMENTS

| | | |
|---|---|---|
| GB | 612795 | 11/1948 |
| JP | 7-54169 Y2 | 12/1995 |

* cited by examiner

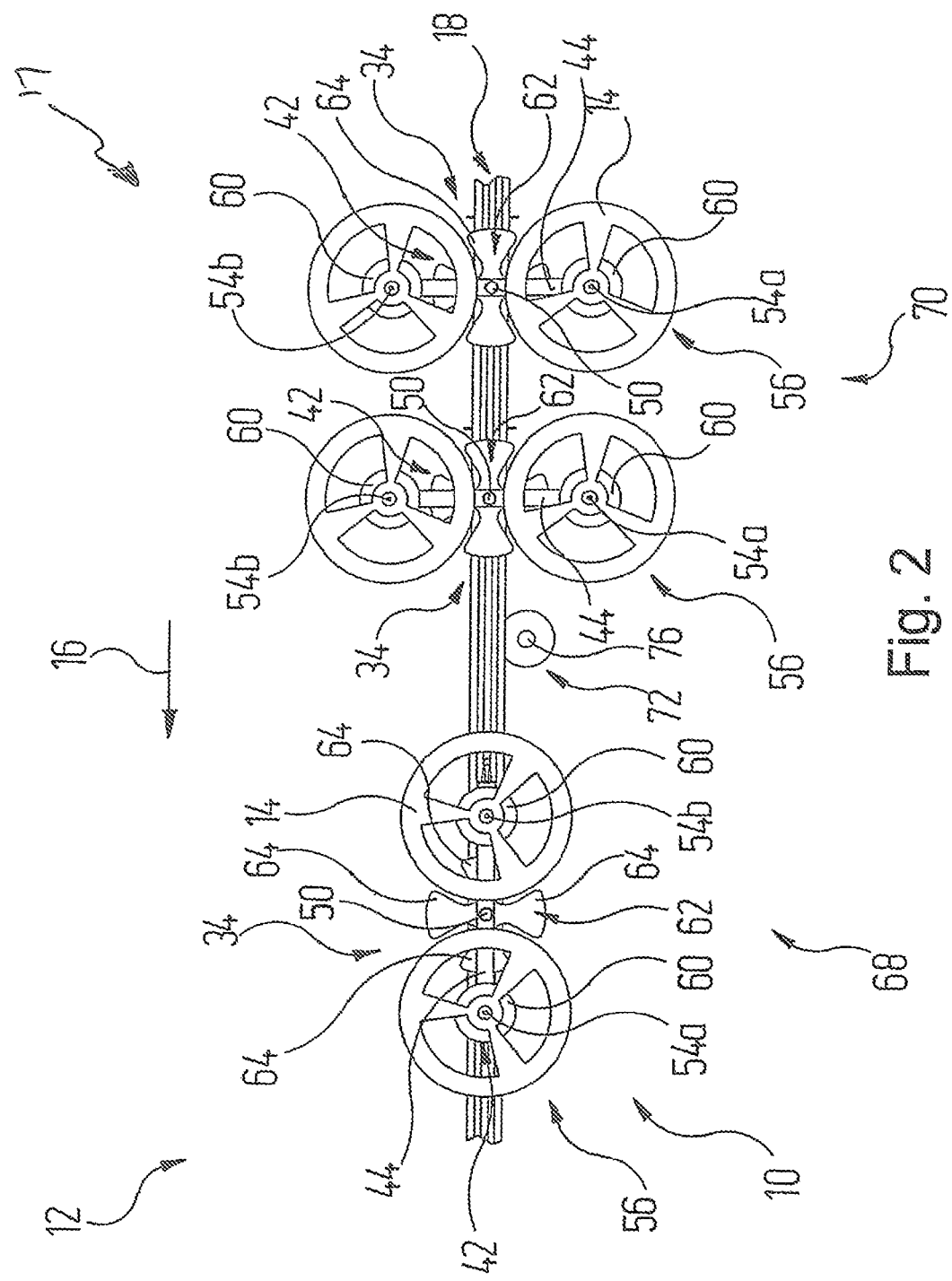

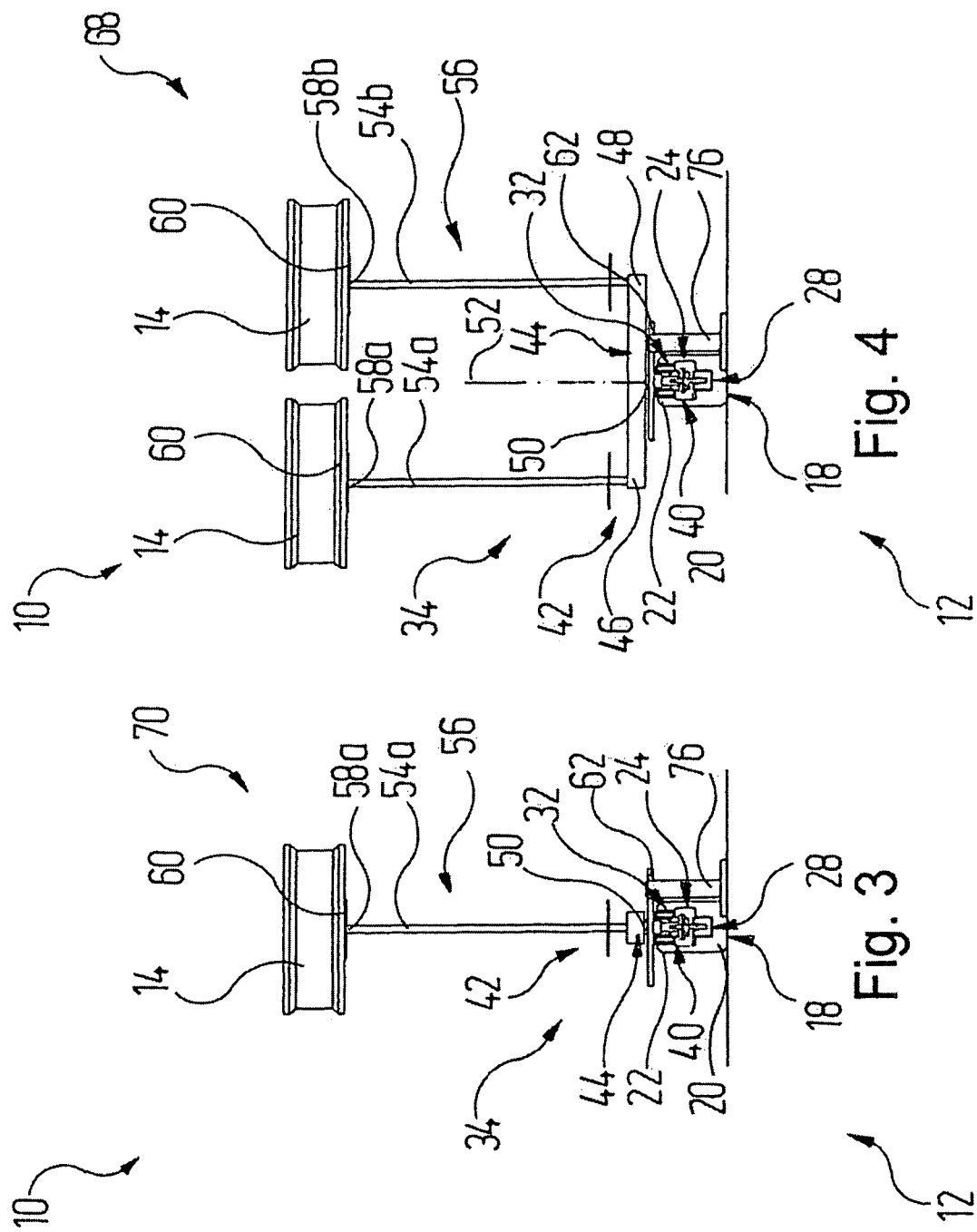

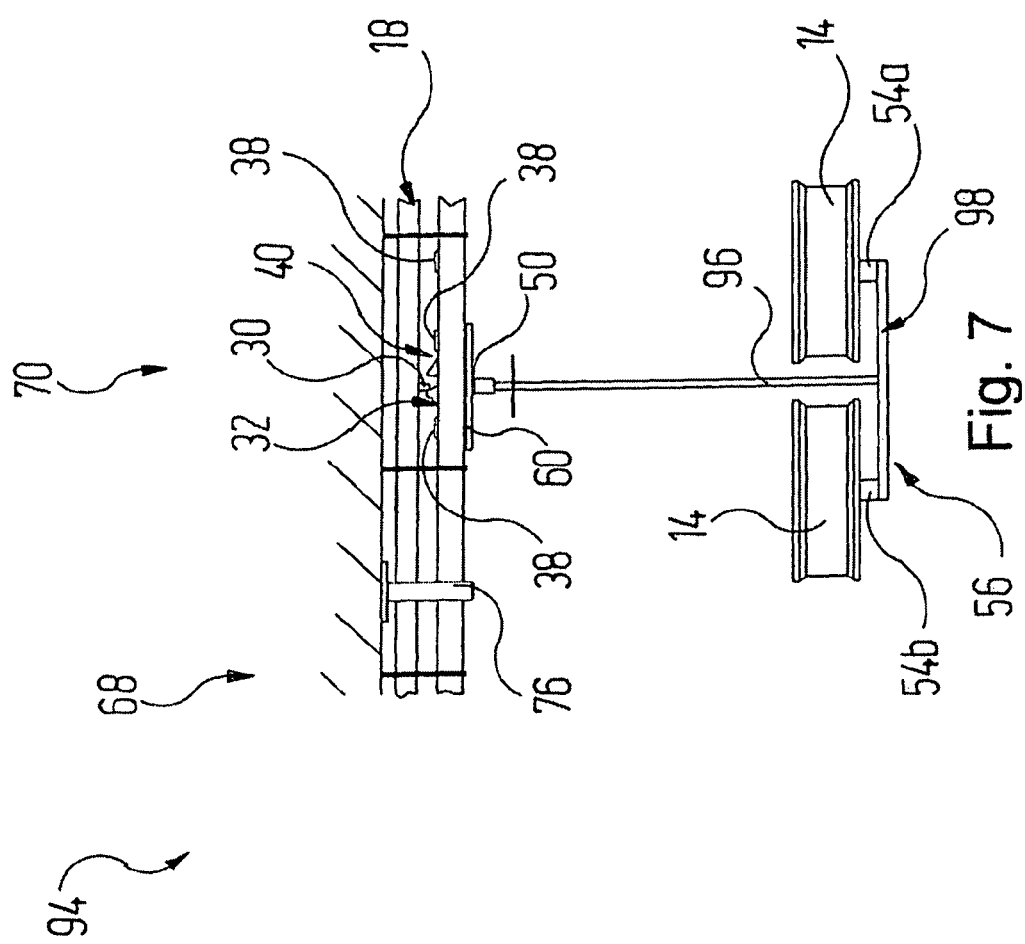

SPINDLE CONVEYOR, AND WORKPIECE TREATMENT STATION COMPRISING THE SAME

RELATED APPLICATIONS

This application claims the filing benefit of International Patent Application No. PCT/EP2012/001780, filed on Apr. 26, 2012, which claims the filing benefit of German Patent Application No. 10 2011 100 825.3, filed on May 7, 2011, the contents of both of which are incorporated herein by reference.

FIELD OF THE INVENTION

The invention relates to a spindle conveyor for conveying workpieces, in particular vehicle wheels, comprising
  a) a rail system which includes at least one carrying rail;
  b) a plurality of transport carriages, each of which includes running gear that is movable in a direction of transport on the carrying rail, and a carrying device for workpieces that is carried along by the running gear;
wherein
  c) each workpiece may be carried by a workpiece spindle that is included in the carrying device.

The invention further relates to a station or plant for treating workpieces, in particular vehicle wheels, comprising a conveying system by means of which the workpieces may be conveyed through the station.

In the present document, the term "workpiece spindle" is understood to be any spindle-shaped element which can accommodate a workpiece either directly or by way of a further holder. Where appropriate, a carrying cage may also be secured to a workpiece spindle, for small parts which are in turn laid in this carrying cage loose. A workpiece spindle of this kind is typically about a meter long but in some circumstances may also be only a few centimeters long, depending on the kind of workpieces which are to be conveyed.

BACKGROUND OF THE INVENTION

Using commercially known spindle conveyers of the type mentioned at the outset, in particular vehicle wheels are conveyed through successive treatment stations of a coating plant in which, in a plurality of treatment steps, the vehicle wheels are provided with a surface coating. Known spindle conveyors of the type mentioned at the outset typically take the form of circular conveyors, with the result that all the vehicle wheels always pass through all the treatment stations.

There are vehicle wheels which differ from one another, in that they are to undergo mutually differing treatment steps or have to pass through the treatment stations provided in a coating plant in a different sequence. Conventionally, it has not been possible to treat vehicle wheels which differ in this way in the same coating plant, since it is not readily possible—and only if the construction is redesigned—to adapt the sequence of steps using a circular conveyor.

It is possible to achieve a certain flexibility for example if buffer zones are added to the rail system, for example in that additional secondary rail sections that are connected by way of points units to a main rail section of the circular conveyor are provided. Secondary rail sections of this kind then form a buffer zone in which transport carriages can be parked temporarily.

In the case of commercially known spindle conveyors, each transport carriage carries along a single workpiece spindle, and on their path through the plant the transport carriages always maintain a spacing, which is predetermined by the process sequence or by the dimensions of the vehicle wheels. In particular, the minimum spacing, which is predetermined by the dimensions of the vehicle wheels, is also maintained in a buffer zone. This limits the buffer capacity per meter of rail.

It is an object of the invention to provide a spindle conveyor and a station or plant of the type mentioned at the outset which take account of these ideas.

SUMMARY OF THE INVENTION

This object may be achieved in the case of a spindle conveyor of the type mentioned at the outset, in that
  d) the carrying device includes a pair of workpiece spindles having a first and a second workpiece spindle;
  e) the pair of workpiece spindles is mounted to rotate, as a unit, in relation to the running gear about a vertical axis of rotation, and may adopt at least a first rotary position and a second rotary position.

In this embodiment according to the invention, at least two workpieces may be received by a transport carriage and your position in relation to the direction of transport may be varied. Here, they may adopt a position in which the space required by two workpieces in the direction of transport is smaller than the space required in this direction by two workpieces that succeed one another. In this way, in a zone of the rail system it is possible to accommodate a larger number—ideally twice the number—of workpieces on the same length of rail than is possible with the conventional transport carriages having a single workpiece spindle. This increases the capacity of the spindle conveyor.

In particular, it is favourable here if
  a) the rail system includes at least one conveying zone and at least one buffer zone;
  b) the pair of workpiece spindles adopts the first rotary position in the at least one conveying zone and adopts the secondary rotary position in the at least one buffer zone.

If there is a buffer zone, different workpieces may be guided through the plant along different paths and consequently pass through different sequences of treatment steps.

In order to enable the workpieces to be aligned appropriate in different regions of the rail system, it is advantageous if the pair of workpiece spindles is coupled to an entraining unit such that it cannot rotate in relation thereto, and by means of this entraining unit the pair of workpiece spindles may be rotated mechanically, by means of an actuating element, from the first rotary position into the second rotary position and/or from the second rotary position into the first rotary position.

Preferably, in this case the first and the second workpiece spindles are arranged behind one another, as seen in the direction of transport, in the first rotary position of the pair of workpiece spindles, and next to one another, as seen in the direction of transport, in the second rotary position of the pair of workpiece spindles.

If the transport carriages include a coupling device by means of which the running gear may be detachably coupled to an endless drive means, known and established drive system may continue to be used. Drive chains have in particular proved their worth as endless drive means.

Here, it is advantageous if the endless drive means carries along entrainers which cooperate with a coupling element of the coupling device, wherein this coupling element may be moved between a coupled position, in which one of the entrainers of the endless drive means can abut against the coupling element, and a released position, in which the entrainers of the endless drive means can be guided past the coupling element without coming into operative contact. In this way, the transport carriages in the buffer zone may be separated from the endless drive means and remain there until they are fed in to the process downstream.

In order to separate a first transport carriage in the buffer zone of the rail system from the endless drive means, it is favourable if a blocking unit is provided there, by means of which the coupling device of the transport carriage may be uncoupled from the endless drive means.

If the transport carriages moreover carry along a release unit by means of which, if a minimum spacing between two successive transport carriages is reached, the coupling device of the transport carriage which is in the rear, as seen in the direction of transport, is uncoupled from the endless drive means, the transport carriages may travel in closer succession to one another than in a conveying zone and form a type of buffer train in the buffer zone.

In this case, the minimum spacing may be predetermined favourably by arranging the release unit at the free end of a spacing arm of the transport carriage. The minimum spacing by which a trailing transport carriage is separated from the drive means may be adjusted by way of the length of this spacing arm.

It may be favourable if the spindle conveyor is constructed in the manner of a floor track, as is indeed the case with current known spindle conveyors.

As an alternative, the spindle conveyor may be constructed in the manner of an overhead track. In this case the most important components of the conveyor, such as rails, drive means and transport carriages, may be arranged above the workpieces, with the result that soiling that occurs during workpiece treatment and may fall down cannot come into contact with the conveyor components and soil them.

In the case of a station or plant of the type mentioned at the outset, the object mentioned above may be achieved in that the conveyor system is a spindle conveyor having some or all of the features mentioned above.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention will be explained in more detail below with reference to the drawings, in which:

FIG. 2 shows a view of the detail of the spindle conveyor from FIG. 1, from above;

FIG. 3 shows a section through the spindle conveyor from FIG. 1, along the line of section there;

FIG. 4 shows a section through the spindle conveyor from FIG. 1, along the line of section IV-IV there;

FIG. 7 shows, schematically, a spindle conveyor in the manner of an overhead track.

DETAILED DESCRIPTION OF THE PRESENT INVENTION

Figure 1:
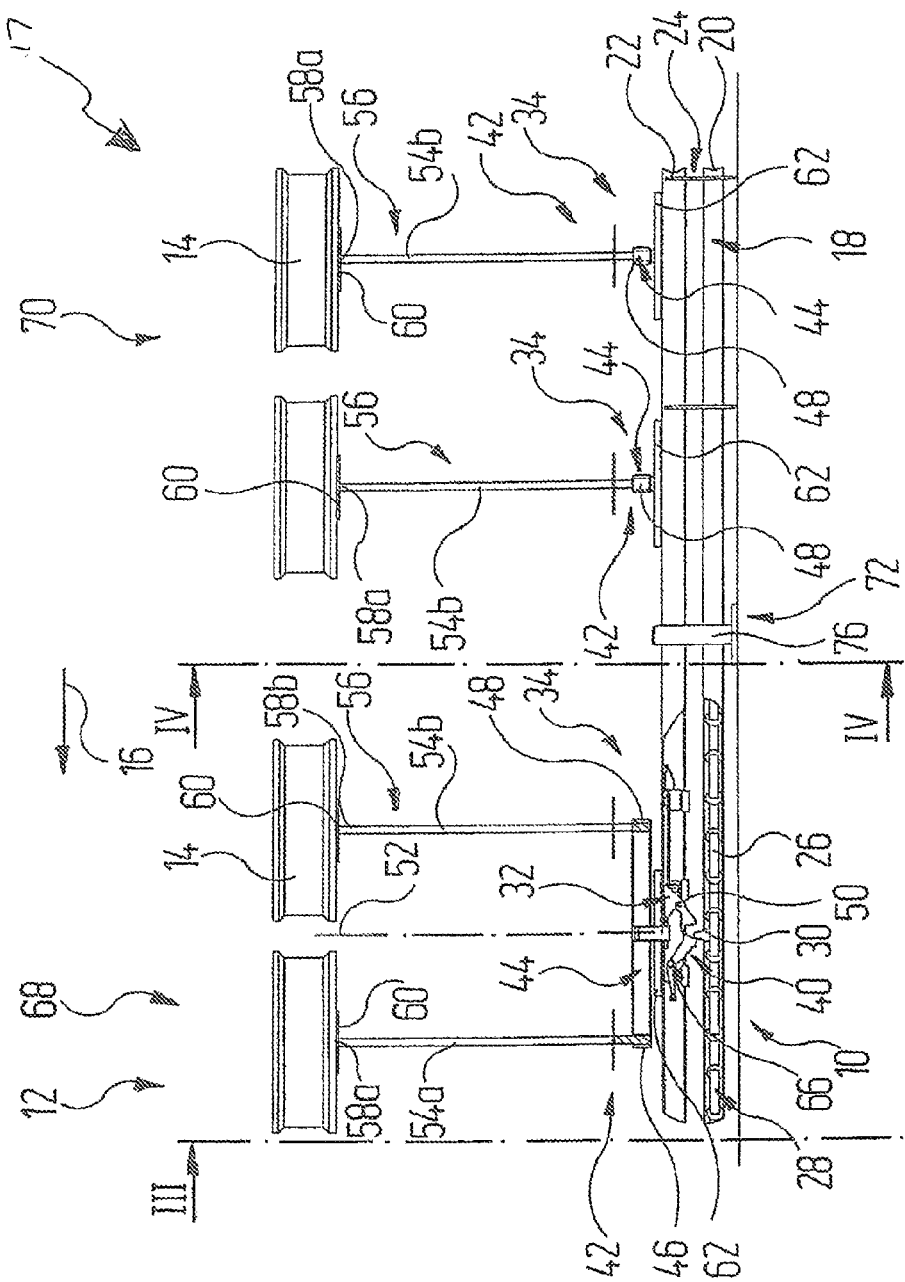
FIG. 1 shows a side view of a detail of a floor-guided spindle conveyor having a carrying rail, wherein a transition between a buffer zone and a conveying zone of the spindle conveyor is shown in a direction of transport, and two transport carriages in a buffer configuration are located in the buffer zone and a transport carriage in a conveying configuration is located in the conveying zone.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

FIGS. 1 and 2 show, respectively in side view and in a view from above, a detail of a floor rail system 10 of a conveying system in the form of a floor-guided spindle conveyor 12 for conveying workpieces. The workpieces are illustrated as vehicle wheels 14, only some of which bear a reference numeral. On the rail system 10, the vehicle wheels 14 are conveyed in a direction of transport 16 through a plant 17 for the treatment of the vehicle wheels 14 which includes the spindle conveyor 12.

In the present exemplary embodiment, the rail system 10 has a single track and includes a carrying rail 18 which is anchored to the floor and includes a lower guide profile 20 and, running vertically above it, an upper guide profile 22, between which there remains a free space forming a coupling region 24.

In the lower guide profile 20 of the carrying rail 18 there runs a portion 26 of an endless drive chain 28, which in the form of an endless drive means carries along a plurality of entrainers 30. The entrainers 30 project upwards from the endless drive chain 28 into the coupling region 24 of the carrying rail 18.

In the upper guide profile 22 of the carrying rail 18 there runs a running gear 32 of a transport carriage 34, which for this purpose carries load-bearing rollers 36, by means of which the running gear 32 runs on a running surface (not itself provided with a reference numeral) of the upper guide profile 22. Moreover, the running gear 32 bears a plurality of guide rollers 38 which stabilise the running gear 32 and hence the transport carriage 34 to prevent both tilting in a direction of transport 16 and tilting to the side, as is known per se. The rollers and guide rollers 36, 38 are in particular readily visible in FIG. 6 and, for the purpose of clarity, are moreover only provided with reference numerals there.

The running gear 32 carries a coupling device 40, part of which projects downwards into the coupling region 24 of the carrying rail 18, and by means of which the transport carriage 34 may be coupled to and released from one of the entrainers 30 of the drive chain 28. This will be discussed in more detail below.

The running gear 32 carries along a carrying device 42 for the vehicle wheels 14. This carrying device includes a horizontal rotary cross piece 44, which is connected to an axial bearing 50 in the middle between its opposing ends 46, 48, such that it cannot rotate in relation thereto, wherein this axial bearing 50, when the spindle conveyor 12 is in operation, projects downwards from the rotary cross piece 44.

On the upper side, remote from the coupling device 40, the running gear 32 bears the axial bearing 50 such that the latter may rotate about an axis of rotation 52 which, when the spindle conveyor 12 is in operation, extends vertically. In the present exemplary embodiment, the longitudinal axis of the axial bearing 50 coincides with the axis of rotation 52.

On its side remote from the axial bearing 50, the rotary cross piece 44 carries at its first end 46 a first workpiece spindle 54a and at its opposing, second end 48 a second workpiece spindle 54b, which are of the same construction and are borne such that they may rotate about their longitudinal axis. Both workpiece spindles 54a, 54b point upwards when the spindle conveyor 12 is in operation, and extend parallel to one another.

The workpiece spindles 54a, 54b form a pair 56 of workpiece spindles and each have at their free end regions 58a, 58b a workpiece receiver, which in the present exemplary embodiment takes the form of a support plate 60 for the vehicle wheels 14, as is known per se.

The spacing between the two workpiece spindles 54a, 54b along the rotary cross piece 44 is adapted to the mode of operation of the treatment plant 17 in which the vehicle wheels 14 are to be treated.

In the present exemplary embodiment, the first and the second workpiece spindle 54a, 54b are secured on the rotary cross piece 44 such that they are stationary and at an invariable spacing from one another. This spacing may for example be predetermined by the equipment used for handling the vehicle wheels 14.

In a modified arrangement, the two workpiece spindles 54a, 54b may also be mounted on the rotary cross piece 44 such that they are displaceable and lockable in an operative position, with the result that the spacing between the workpiece spindles 54a, 54b along the rotary cross piece 44 may be adjusted.

Between the rotary cross piece 44 and the running gear 32, and above the carrying rail 18, the axial bearing 50 carries, such that it cannot rotate in relation thereto, a horizontally aligned turntable element 62 which serves as an entraining unit and has four entraining lugs 64 which are at an angle of 90° to one another. When the turntable element 62 is actuated, the axial bearing 50 is rotated in relation to the running gear 32 of the transport carriage 34, with the rotary cross piece 44 following this rotation, together with the pair 56 of workpiece spindles. In this way, the pair 56 of workpiece spindles can be rotated as a unit in relation to the running gear 32 of the transport carriage 34.

During this, the pair 56 of workpiece spindles is able to adopt four positions which succeed one another in a direction of rotation and are offset by 90° in each case, wherein each two rotary positions that are offset by 180° have the same function and each define an operational configuration of the transport carriage 34:

On the one hand, there is a conveying configuration of the transport carriage 34, in which the workpiece spindles 54a, 54b adopt as the first rotary position a conveying position in which they are arranged behind one another as seen in the direction of transport 16. Here, either the first workpiece spindle 54a or the second workpiece spindle 54b can adopt the front position, as seen in the direction of transport 16. For example, in FIG. 1 the pair 56 of workpiece spindles of the transport carriage 34 shown on the far left adopts the conveying position, with the result that the vehicle wheels 14 are conveyed behind one another, as seen in the direction of transport 16.

On the other hand, there is a buffer configuration of the transport carriage 34 in which the workpiece spindles 54a, 54b adopt as the second rotary position a buffer position in which they are arranged next to one another as seen in the direction of transport 16. Here, either the first workpiece spindle 54a or the second workpiece spindle 54b can adopt the left-hand position, as seen in the direction of transport 16. For example, in FIG. 1 the pairs 56 of workpiece spindles of the two transport carriages 34 shown on the right adopt this buffer position, with the result that the vehicle wheels 14 are conveyed next to one another, as seen in the direction of transport 16.

The carrying device 42 may be stabilised, in the conveying position or the buffer position, by means of a holding device 66 to prevent unintentional rotation. For this purpose, for example a portion of the axial bearing 50 may have a square cross section, with resilient webs abutting against two opposing outer surfaces of this portion. These resilient webs are able to hold the axial bearing 50 and hence the carrying device 42 in the adopted conveying or buffer position without the action of an external force.

When the carrying device 42 is rotated from the buffer position into the conveying position or vice versa, the retaining force of the resilient webs has to be overcome. Because of the square cross section of the axial bearing 50, when the latter is rotated the resilient webs are first bent apart until, after rotating through 90°, they abut again against two opposing outer surfaces of the portion of the axial bearing 50 that is square in cross section.

The rail system 10 of the spindle conveyor 12 includes a plurality of conveying zones 68 and a plurality of buffer zones 70, with a buffer zone 70 connecting two conveying zones 68 to one another in each case. The buffer zones 70 for example take the form of a portion of a secondary rail section which runs alongside a main rail section and is connected thereto by way of points units (not shown). The transport carriages 34 are driven along a main rail section of this kind for example by means of the endless drive chain 28, which is guided around in a circle.

The term "conveying zone" is to be understood to mean any region of the rail system 10 which does not serve as a buffer zone, and in which the transport carriages 34 adopt their conveying configuration. Thus, the points units, or rail portions leading to the carrying rail 18 in the buffer zone 70, should also be considered a respective conveying zone 68.

In the present exemplary embodiment, the endless drive chain 28 moves at the same speed in the buffer zone 70 as in the conveying zone 68. In a modified arrangement, there may be for example in the buffer zone 70 an independent drive chain by means of which the transport carriages 34 are conveyed in the buffer zone 70. In this case, the transport carriages 34 may be moved at different speeds in the conveying zone 68 and the buffer zone 70.

Figure 5:
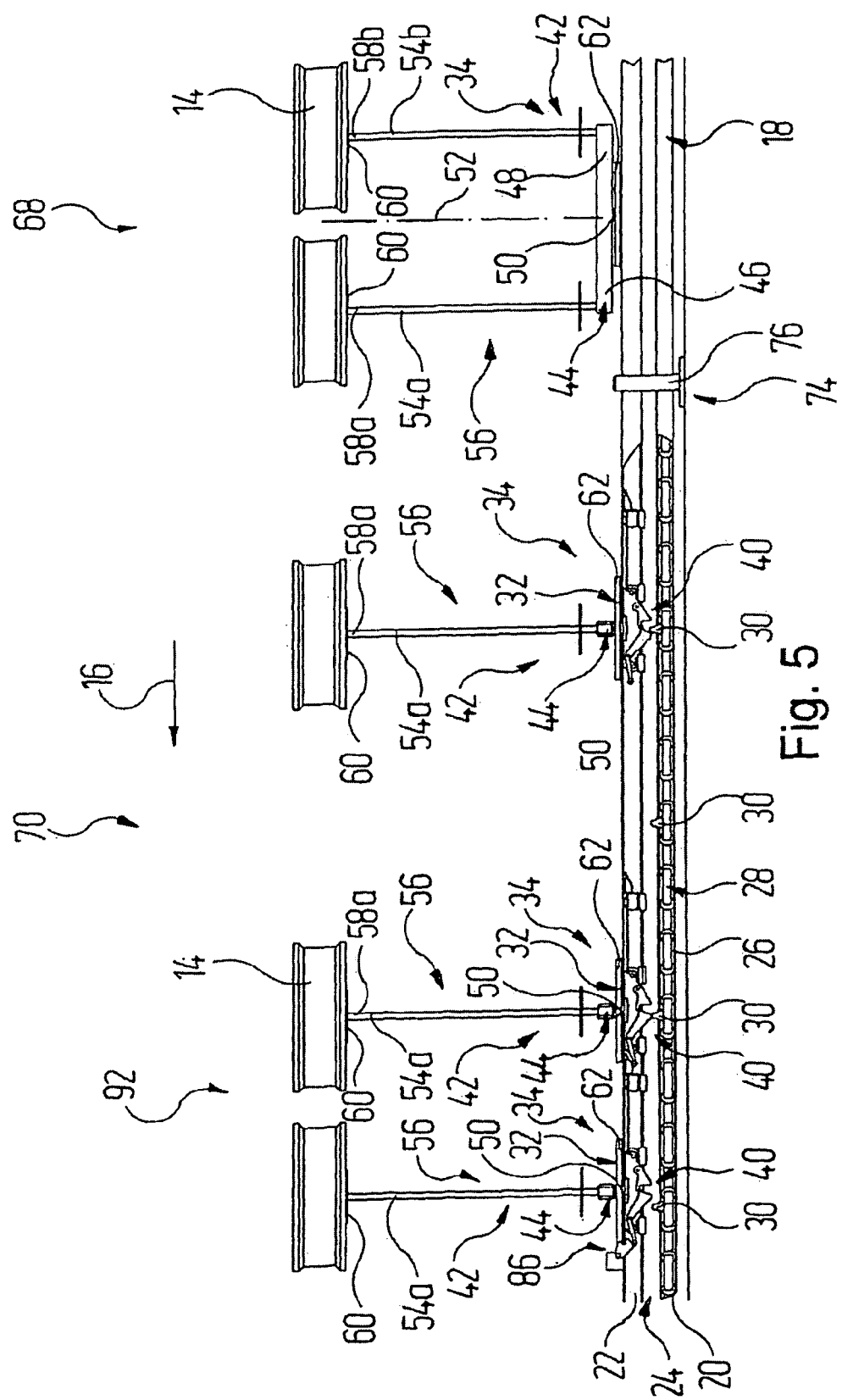
FIG. 5 shows a side view of a transition between a conveying zone and the buffer zone of the spindle conveyor.

In FIGS. 1 and 2, a transition 72 is shown between a buffer zone 70 and a conveying zone 68 which is downstream of the buffer zone 70 as seen in the direction of transport 16. FIG. 5, by contrast, shows a transition 74 between a conveying zone 68, which is upstream of the buffer zone 70 as seen in the direction of transport 16, and this buffer zone 70.

In the conveying zones 68, the transport carriages 34 occupy their conveying configuration, and in the buffer zones they occupy their buffer configuration. When the transport carriages 34 are moved out of the conveying zone 68 and into the buffer zone 70 or back out of the buffer zone 70 and into the conveying zone 68, the pairs 56 of workpiece spindles are rotated out of the conveying position and into the buffer position, or out of the buffer position and into the conveying position.

For this purpose, the rotary cross piece 62 of the carrying device 42 for the transport carriages 34 cooperates with actuating elements in the form of actuating pins 76, of which in each case one is arranged laterally alongside the carrying rail 18, at the transition 72 or 74 between a conveying zone 68 and a buffer zone 70 of the rail system 10. In this case, the actuating pins 76 are positioned and project upwards from the floor far enough to abut against the respectively laterally projecting entraining lug 64 of the rotary cross piece 62 of the transport carriage 34 and to rotate the latter through 90° if a transport carriage 34 moves past an actuating pin 76 in the direction of transport 16. As a result, the carrying unit 42 is then rotated through 90° about the axis of rotation 52.

In the buffer zones 70, the transport carriages 34 may be parked according to the first-in first-out principle, and for this purpose they must be separated from the drive chain 28 in the buffer zones 70. As mentioned above, this is made possible by the coupling device 40. Moreover, the coupling device 40 allows the transport carriages 34 to be moved closer to one another in the buffer zones 70 than in the conveying zones 68, where they maintain a conveying spacing which is predetermined by the spacing between two entrainers 30 of the drive chain 28.

Figure 6:
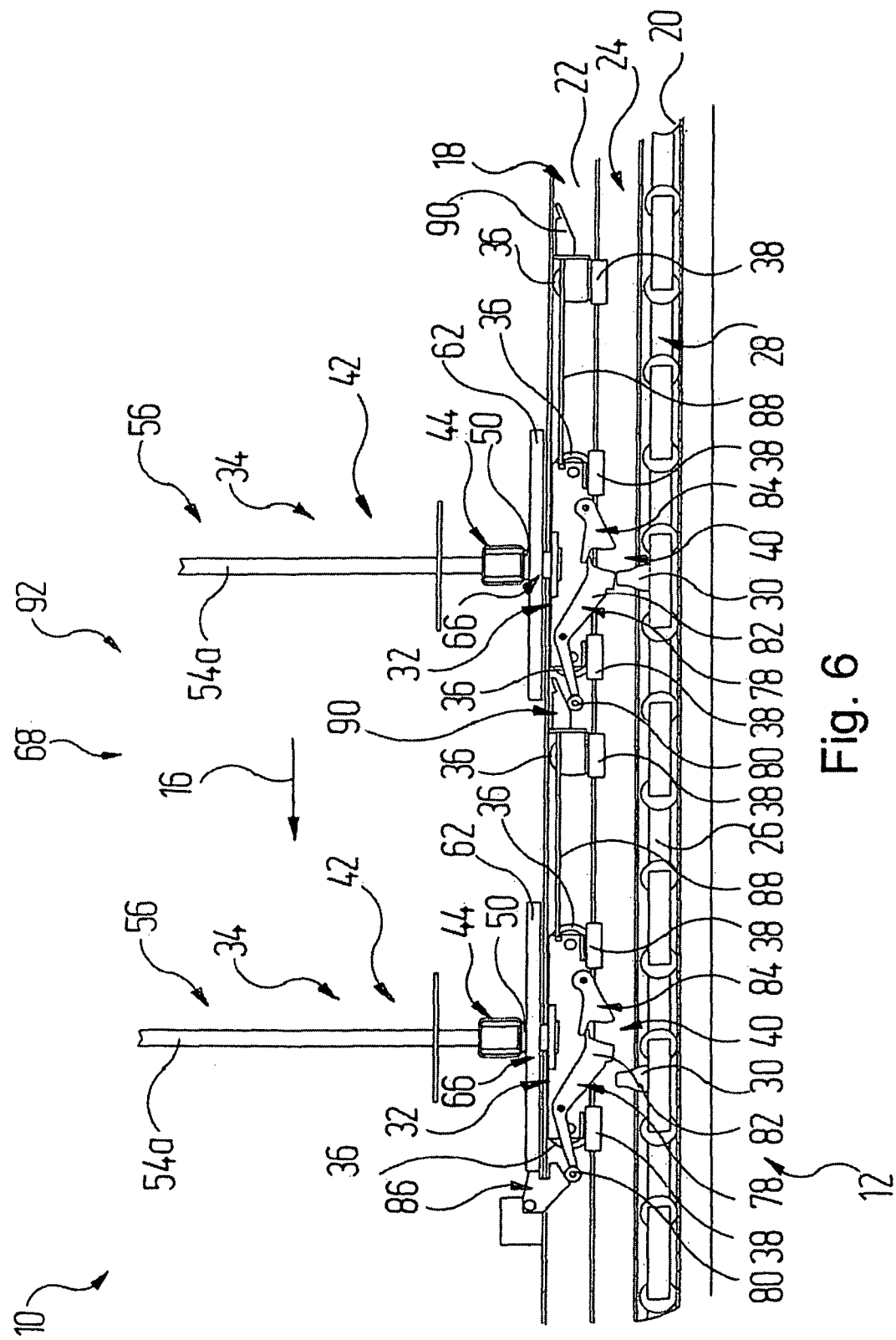
FIG. 6 shows a side view, corresponding to FIG. 5 and on a larger scale, in order to illustrate coupling devices of the transport carriages.

The coupling device 40 can be seen in detail in FIG. 6 and includes, as seen in the direction of transport 16, a leading rocker member 78 which is borne on the running gear 32 such that it may pivot about a horizontal pivot axis that extends perpendicular to the direction of transport 16. At its front end as seen in the direction of transport 16, the rocker member 78 carries a rising roller 80 whereof the axis of rotation also extends horizontally and perpendicular to the direction of transport 16.

At its opposite end, the rocker member 70 forms a coupling element 82 which, on pivoting of the rocker member 78, can be moved between a lower coupled position and an upper released position. In the coupled position, the coupling element 82 projects far enough into the coupling region 24 of the carrying rail 18 for an incoming entrainer 30 of the drive chain 28 to abut against the front rocker member 78, as a result of which the transport carriage 34 is carried along by the drive chain 28.

In the released position, the coupling element 82 is moved upwards out of the coupling region 24 of the carrying rail 18 far enough for the entrainers 30 of the drive chain 28 to be able to pass underneath the coupling device 40 without coming into operative contact with the coupling element 82. This means that in some cases there may be a light contact with the components but this does not result in the transport carriage 34 being carried along by the drive chain 28.

In order to enable the transport carriages 34 to be driven in opposition to the direction of transport 16 as well, which may need to be possible for example when shunting the transport carriages 34, the coupling device 40 also includes a rear rocker member 84, as seen in the direction of transport 16. This rear rocker member 84 is also borne on the running gear 32 such that it may pivot about a horizontal pivot axis that extends perpendicular to the direction of transport 16. The rear rocker member 84 follows the pivotal movement of the front rocker member 78, with the result that it frees the path for the entrainers 30 of the drive chain 28 when the coupling element 82 adopts its released position. When the coupling element 82 is in its coupled position, the rear rocker member 84 projects into the coupling region 24 of the carrying rail 18 far enough to flank a corresponding entrainer 30 of the drive chain 28.

Moreover, the rear rocker member 84 prevents a transport carriage 34 from accelerating in the direction of transport 16 and detaching itself from the entrainer 30 of the drive chain 28, if there is a descending portion of the carrying rail 18, which in some cases may even be formed simply by constructional tolerances. In this case the transport carriage 34 is braked by the rear rocker member 84 abutting against the corresponding entrainer 30 of the drive chain 28. This allows the transport carriages 34 as a whole to cope with ascending and descending sections.

Even when the rear rocker member 84 adopts its appropriate lower coupled position, it is always able to yield upwards to an entrainer 30 of the drive chain 28 that is passing in the direction of transport 16, with the result that this entrainer 30 overcomes the rear rocker member 84 and then abuts against the front rocker member 78 and its coupling element 82.

At the transition 72 from the buffer zone 70 to the conveying zone 68, there is provided as a blocking unit a separating ramp 86 which may be put optionally in a separating position or a release position. In the separating position, which is shown in FIG. 6, the separating ramp 86 is arranged in the path of movement of the transport carriages 34 such that the rising roller 80 of the front rocker member 78 of the coupling device 40 rolls onto a roll surface of the separating ramp 86 which is downwardly inclined, as seen in the direction of transport 16.

The geometry and dimensions of the separating ramp 86 are adapted to the front rocker member 78 such that the coupling element 82 thereof is then raised into the released position, as a result of which the transport carriage 34 is separated from the drive chain 28 and the entrainers 30 thereof run underneath the coupling device 40. At the same time, the separating ramp 86, in its separating position, serves as a barrier to the transport carriage 34, and prevents it from moving in the direction of transport 16.

The running gear 32 of each transport carriage 34 includes a spacing arm 88 which extends in the direction opposed to the direction of transport 16 and carries at its free end a buffer ramp 90 which similarly has a roll surface which is downwardly inclined as seen in the direction of transport 16. This buffer ramp 90 forms a release unit and cooperates with the front rocker member 78 of a trailing transport carriage 34 in the same way as the separating ramp 86 of the buffer zone 70.

Thus, when a transport carriage 34 that is carried along by the drive chain 28 comes to a transport carriage 34 which is at rest on the carrying rail 18 and is uncoupled from the drive chain 28, the front rocker member 78 of the transport carriage 34 which is still being driven will run up onto the buffer ramp 90 of the transport carriage 34 at rest if the spacing between the two transport carriages 34 falls below a minimum spacing.

As a result, the coupling device 40 of the rising transport carriage 34 is uncoupled from the drive chain 28, and the two transport carriages 34 form a detached buffer train 92, which can be seen in FIGS. 5 and 6 and in which the individual transport carriages 34 are not coupled to one another. If this last is to happen, in a modified arrangement for example corresponding coupling catches are provided which detachably connect two adjacent transport carriages 34 to one another.

The minimum spacing between two adjacent transport carriages 34 in this buffer train 92 is determined by the length of the spacing arm 88 of each transport carriage 34, and is smaller than the spacing between two successive entrainers 30 of the drive chain 28.

When the separating ramp 86 is brought into its released position, the front rocker member 78 of the coupling device 40 of the transport carriage 34—that is, the transport carriage 34 abutting against the separating ramp 86—pivots back into its coupled position. The next entrainer 30 of the drive chain 28 to arrive at the transport carriage 34 then abuts against the coupling element 82 of the front rocker member 78 and drives the transport carriage 34 in the direction of transport 16.

The transport carriage 34 is now guided past the actuating pin 76 between the buffer zone 70 and the conveying zone 68, as a result of which the pair 56 of workpiece spindles is rotated into its conveying position.

When the transport carriage 34 is moved away from the transport carriage 34 succeeding it, the buffer ramp 90 of the transport carriage 34 is detached from the front rocker member 78 of the successive transport carriage 34, as a result of which the latter is coupled again to the next entrainer 30 of the drive chain 28 to go past and is carried along by the drive chain 28. This is repeated, in the manner of a cascade, for all the successive transport carriages 34.

If the separating ramp 86 of the buffer zone 70 remains in its released position, the now succeeding transport carriage or carriages 34 also move(s) into the conveying zone 68.

Once the desired number of transport carriages 34 has moved from the buffer zone 70 to the conveying zone 68, the separating ramp 86 is once again put in its separating position such that the buffer train 92 can be formed in the buffer zone 70 again.

The principle explained above may, as an alternative, also be used with other rail systems, in particular also overhead track systems.

FIG. 7 shows by way of example, as a modified arrangement, a spindle conveyor 94 which is constructed in the manner of an overhead track conveyor. Here, components corresponding to those of the spindle conveyor 12 in FIGS. 1 to 6 bear the same reference numerals.

Here, the carrying rail 18 is arranged at a level above the floor by means of beam constructions which are not themselves shown. The spindle conveyor 94 may for example be constructed in the manner of a so-called power and free conveyor, as is known per se.

The carrying device 42 here includes a perpendicular carrying strut 96 which is coaxially connected to the axial bearing 50. At its lower end, remote from the axial bearing 50, the carrying strut 96 carries a U-shaped spindle structure 98 which again predetermines a pair 56 of workpiece spindles having a first workpiece spindle 54a and a second workpiece spindle 54b.

Otherwise, the statements made above about the spindle conveyor 12 apply accordingly.

Where appropriate, in the case of the spindle conveyors 12 and 94 explained above, it may happen that the transport carriages 34 are to adopt their buffer configuration in a conveying zone 68 and their conveying configuration in a buffer zone 70. This may be necessary for example at the transition from a horizontal portion to an ascending portion or from a descending portion to a horizontal portion of the carrying rail 18.

This may be brought about by actuating pins 76 which are positioned accordingly and in addition in a conveying zone 68 or buffer zone 70. As an alternative, at the transition from a conveying zone 68 to a buffer zone 70—or vice versa—there may be no actuating pin 76, with the result that the transport carriage moves into the successive zone with no change in configuration.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A spindle conveyor for conveying workpieces comprising:
   a) a rail system which includes at least one carrying rail;
   b) a plurality of transport carriages, each of which includes running gear that is movable in a direction of transport on the at least one carrying rail, and a carrying device for workpieces that is carried along by the running gear;
   wherein
   c) each workpiece is supported by a workpiece spindle that is included in the carrying device, and wherein
   d) the carrying device includes a pair of workpiece spindles comprising a first and a second workpiece spindle, wherein the first workpiece spindle supports a first workpiece and the second workpiece spindle supports a second workpiece;
   e) the pair of workpiece spindles is mounted to rotate, as a unit, in relation to the running gear about a vertical axis of rotation, and may adopt at least a first rotary position and a second rotary position,
   wherein the pair of workpiece spindles is coupled to an entraining unit such that the pair of workpiece spindles cannot rotate in relation thereto, and, with an actuating element, which rotates the pair of workpiece spindles mechanically from the first rotary position into the second rotary position and/or from the second rotary position into the first rotary position.

2. The spindle conveyor according to claim 1, wherein
   a) the rail system includes at least one conveying zone and at least one buffer zone; and,
   b) the pair of workpiece spindles adopts the first rotary position in the at least one conveying zone and adopts the secondary rotary position in the at least one buffer zone.

3. The spindle conveyor according to claim 1, wherein the first and the second workpiece spindles are arranged behind one another, as seen in the direction of transport, in the first rotary position of the pair of workpiece spindles, and next to one another, as seen in the direction of transport, in the second rotary position of the pair of workpiece spindles.

4. The spindle conveyor according to claim 1, wherein the transport carriages include a coupling device which detachably couples the running gear to an endless drive means.

5. The spindle conveyor according to claim 4, wherein the endless drive means includes entrainers which cooperate with a coupling element of the coupling device, wherein this coupling element may be moved between a coupled position, in which one of the entrainers of the endless drive means can abut against the coupling element, and a released position, in which the entrainers of the endless drive means can be guided past the coupling element without coming into operative contact.

6. The spindle conveyor according to claim 4, wherein
   the rail system includes at least one conveying zone and at least one buffer zone and the pair of workpiece spindles adopts the first rotary position in the at least one conveying zone and adopts the secondary rotary position in the at least one buffer zone, and
   further comprising a blocking unit in a buffer zone of the rail system which uncouples the coupling device of the transport carriage from the endless drive means.

7. The spindle conveyor according to claim 4, wherein the transport carriages include a release unit which, if a minimum spacing between two successive transport carriages is reached, uncouples the coupling device of the transport carriage which is in the rear, as seen in the direction of transport, from the endless drive mean.

8. The spindle conveyor according to claim 7, wherein the release unit is arranged at a free end of a spacing arm of the transport carriage.

9. The spindle conveyor according to claim 1, wherein the spindle conveyor is a floor track.

10. The spindle conveyor according to claim 1, wherein the spindle conveyor is an overhead track.

11. A plant for treating workpieces comprising:
 a conveying system which conveys the workpieces through the plant, wherein the conveying system is the spindle conveyor according to claim 1.

12. The spindle conveyor according to claim 1, wherein the first workpiece spindle includes a first support plate and the second workpiece spindle includes a second support plate, wherein the first support plate supports the first workpiece and the second support plate supports the second workpiece.

13. A spindle conveyor for conveying workpieces comprising:
 a) a rail system which includes at least one carrying rail;
 b) a plurality of transport carriages, each of which includes running gear that is movable in a direction of transport on the at least one carrying rail, and a carrying device for workpieces that is carried along by the running gear;
wherein
 c) each workpiece is supported by a workpiece spindle that is included in the carrying device, and wherein
 d) the carrying device includes a pair of workpiece spindles comprising a first and a second workpiece spindle, wherein the first workpiece spindle supports a first workpiece and the second workpiece spindle supports a second workpiece;
 e) the pair of workpiece spindles is mounted to rotate, as a unit, in relation to the running gear about a vertical axis of rotation, and may adopt at least a first rotary position and a second rotary position,
 wherein the first and the second workpiece spindles are arranged behind one another, as seen in the direction of transport, in the first rotary position of the pair of workpiece spindles, and next to one another, as seen in the direction of transport, in the second rotary position of the pair of workpiece spindles.

14. A spindle conveyor for conveying workpieces comprising:
 a) a rail system which includes at least one carrying rail;
 b) a plurality of transport carriages, each of which includes running gear that is movable in a direction of transport on the at least one carrying rail, and a carrying device for workpieces that is carried along by the running gear;
wherein
 c) each workpiece is supported by a workpiece spindle that is included in the carrying device, and wherein
 d) the carrying device includes a pair of workpiece spindles comprising a first and a second workpiece spindle, wherein the first workpiece spindle supports a first workpiece and the second workpiece spindle supports a second workpiece;
 e) the pair of workpiece spindles is mounted to rotate, as a unit, in relation to the running gear about a vertical axis of rotation, and may adopt at least a first rotary position and a second rotary position,
 wherein the transport carriages include a coupling device which detachably couples the running gear to an endless drive means, and
 further wherein the rail system includes at least one conveying zone and at least one buffer zone and the pair of workpiece spindles adopts the first rotary position in the at least one conveying zone and adopts the secondary rotary position in the at least one buffer zone, and further comprising a blocking unit in a buffer zone of the rail system which uncouples the coupling device of the transport carriage from the endless drive means.

15. A spindle conveyor for conveying workpieces comprising:
 a) a rail system which includes at least one carrying rail;
 b) a plurality of transport carriages, each of which includes running gear that is movable in a direction of transport on the at least one carrying rail, and a carrying device for workpieces that is carried along by the running gear;
wherein
 c) each workpiece is supported by a workpiece spindle that is included in the carrying device, and wherein
 d) the carrying device includes a pair of workpiece spindles comprising a first and a second workpiece spindle, wherein the first workpiece spindle supports a first workpiece and the second workpiece spindle supports a second workpiece;
 e) the pair of workpiece spindles is mounted to rotate, as a unit, in relation to the running gear about a vertical axis of rotation, and may adopt at least a first rotary position and a second rotary position,
 wherein the transport carriages include a coupling device which detachably couples the running gear to an endless drive means, and
 further wherein the transport carriages include a release unit which, if a minimum spacing between two successive transport carriages is reached, uncouples the coupling device of the transport carriage which is in the rear, as seen in the direction of transport, from the endless drive mean.

16. A spindle conveyor for conveying workpieces comprising:
 a) a rail system which includes at least one carrying rail;
 b) a plurality of transport carriages, each of which includes running gear that is movable in a direction of transport on the at least one carrying rail, and a carrying device for workpieces that is carried along by the running gear;
wherein
 c) each workpiece is supported by a workpiece spindle that is included in the carrying device, and wherein
 d) the carrying device includes a pair of workpiece spindles comprising a first and a second workpiece spindle, wherein the first workpiece spindle supports a first workpiece and the second workpiece spindle supports a second workpiece;
 e) the pair of workpiece spindles is mounted to rotate, as a unit, in relation to the running gear about a vertical axis of rotation, and may adopt at least a first rotary position and a second rotary position,
 wherein the spindle conveyor is an overhead track.

17. A spindle conveyor for conveying workpieces comprising:
  a) a rail system which includes at least one carrying rail;
  b) a plurality of transport carriages, each of which includes running gear that is movable in a direction of transport on the at least one carrying rail, and a carrying device for workpieces that is carried along by the running gear;
wherein
  c) each workpiece is supported by a workpiece spindle that is included in the carrying device, and wherein
  d) the carrying device includes a pair of workpiece spindles comprising a first and a second workpiece spindle, wherein the first workpiece spindle supports a first workpiece and the second workpiece spindle supports a second workpiece;
  e) the pair of workpiece spindles is mounted to rotate, as a unit, in relation to the running gear about a vertical axis of rotation, and may adopt at least a first rotary position and a second rotary position,
  wherein the first workpiece spindle includes a first support plate and the second workpiece spindle includes a second support plate, wherein the first support plate supports the first workpiece and the second support plate supports the second workpiece.

* * * * *